Figure 1:
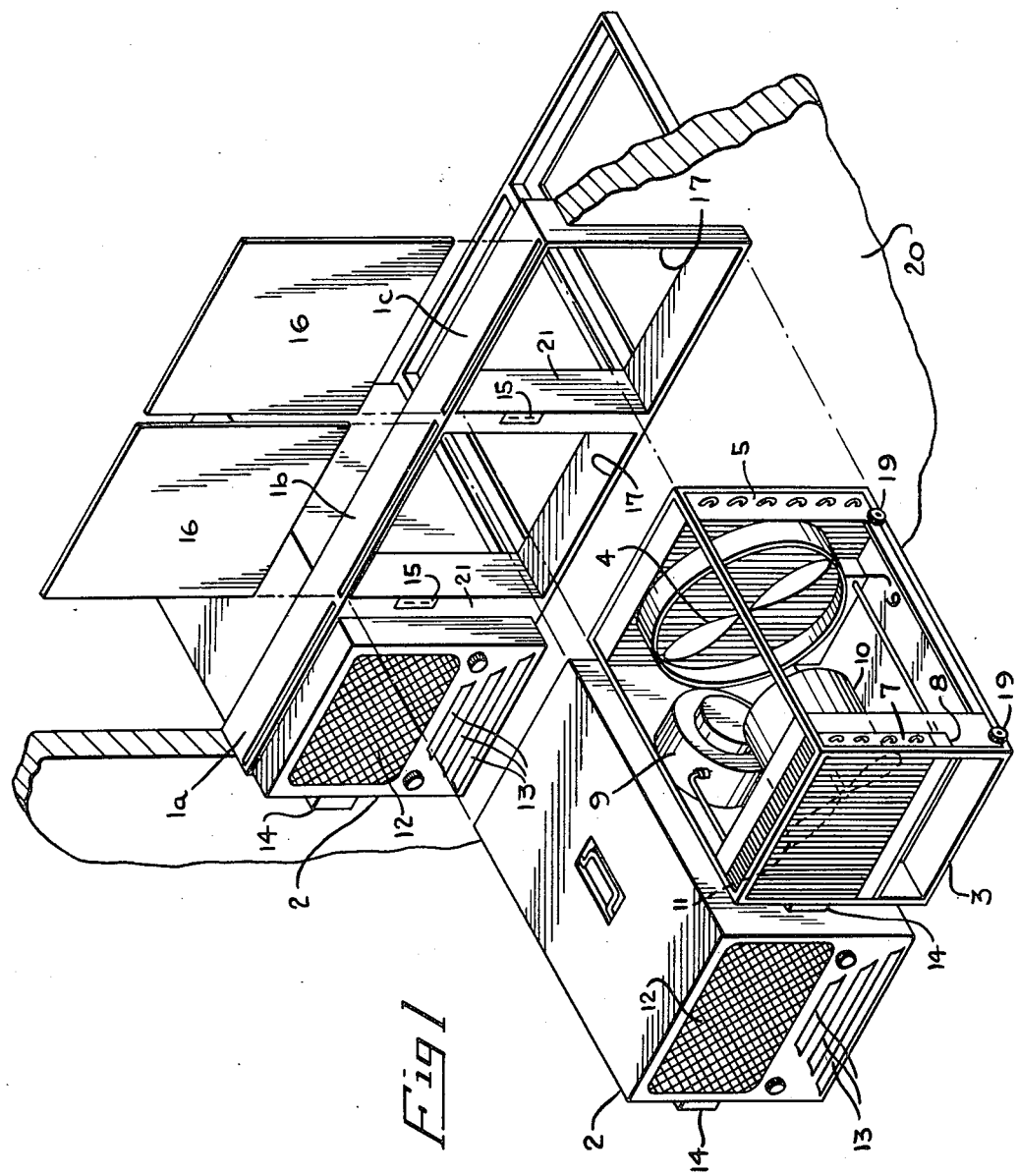

INVENTOR:
ERIC PETER CAHN,
BY

HIS AGENTS.

United States Patent Office 2,746,826
Patented May 22, 1956

2,746,826

AIR CONDITIONER INSTALLATION

Eric P. Cahn, Long Island City, N. Y.

Application September 17, 1953, Serial No. 380,765

3 Claims. (Cl. 312—101)

This invention relates to an air conditioner unit for general use as home, console and window room air conditioner.

The hitherto customary window air conditioners are manufactured for a capacity of ⅓ ton or H. P., ½ ton or H. P., ¾ ton or H. P., or 1 ton or H. P. and as a console unit or home unit for a capacity of 1 and 2 H. P. The most popular window air conditioner is at the present built for a capacity of ¾ ton or H. P.; however, a window unit of this capacity will be already taxing the maximum capacity for power supply in the average town apartment; as a matter of fact it will frequently surpass the available power supply for the average apartments of older buildings. Therefore, the permanent installation of two units of ¾ H. P. each, to be used in the same apartment, for instance, in the living room and/or in the bedroom, frequently would entail an excessive load for the normal current supply. Neither the utility companies nor the landlords of the building will, therefore, permit the installation of air conditioner units which require this large power demand.

Consequently, the modern greatly increasing demand for window air conditioners, particularly in older apartments, offices and factory buildings can frequently not be met on account of the limitations and difficulties in the power supply and the simultaneous use of more than one of the customary air conditioner units seems to be prohibitive for the time being.

In view of this it is generally prohibitive to use more than one unit in an apartment or a small house where a unit can be placed permanently either in the living room or in the bedroom, but is never adaptable to change of location.

This difficulty is not eliminated by the use of a portable or transportable window or console air conditioner as the mounting and installation costs for such portable or transportable equipment are extremely high and require the cooperation of expert maintenance mechanics. Moreover, the great difficulty arising from a restricted power supply and from the simultaneous use of sufficiently powerful units is not and cannot be solved by any hitherto known portable or transportable air conditioner.

It is the main object of the invention to eliminate the difficulties and drawbacks involved in the use of transportable and/or portable air conditioners and particularly those having a capacity of ½ H. P. or ton, ¾ H. P. or ton, 1 H. P. or ton or a greater capacity.

Another object of the invention is to save time cost and expert help during the removal of the air conditioner and repositioning of the same in a different location.

It is also an object of the invention to increase the operative capacity of the air conditioner installation without undue interference with the existing total power supply.

It should be kept in mind that the units of ½ H. P., ¾ H. P., 1 H. P. or more used at present are not sufficiently light in weight, not small enough in dimension and too difficult in handling and positioning to permit a satisfactory transport and mounting. Even under application of a dolly they cannot be moved from the window of one room to that of another as the customary permanent installation prohibits such multiple use.

Moreover, at present no air conditioners exist which have a sufficiently small weight, are sufficiently compact in space and so conveniently built that they can be easily removed from one place or window to the other, which would permit their classification as easily portable and removable air conditioner units to be easily moved from one room to the other or one house to another without the use of experienced services and the help of a maintenance crew.

It therefore is an important object of this invention to build an air conditioning unit which is sufficiently small in space requirements and low enough in weight to become portable and which fits in a prepared frame.

It is a further object of the invention to eliminate the difficulties arising from the transport of air conditioner units and enable their easy removal from one to another place by a single person eliminating thereby the assistance of expert helpers for re-installation.

The above identified objects and requirements of an easily removable and portable air conditioner are realized by the instant invention, which in the following will be described in detail with reference to the accompanying drawings.

Figure 2:
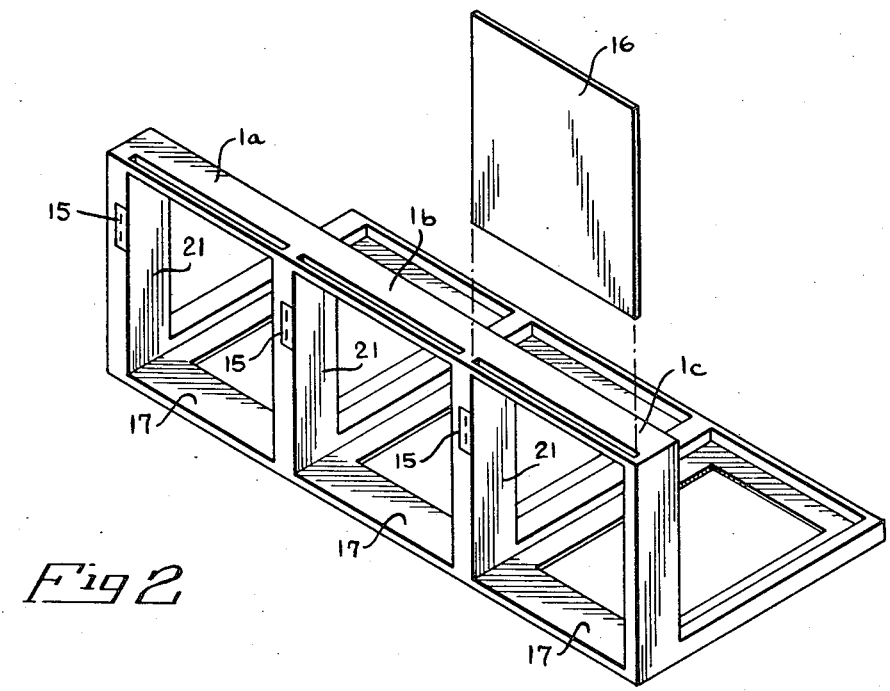
Figure 3:
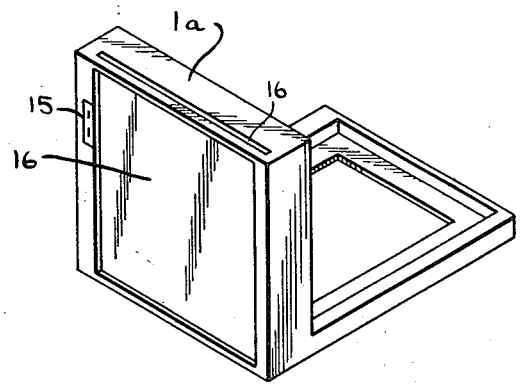

In the drawings,

Figure 1 shows a perspective view of my transportable air conditioning unit for use in a window, Figure 2 shows the window frame and a window located above the same, Figure 3 shows the same frame, the window being in the closed position.

It is, however, understood that the invention is not restricted to this particular application of window air conditioners but may in the same manner also be applied to console and home air conditioners.

As apparent from the drawing, there is provided an L-shaped bracket frame having an open rectangular front portion and a rectangular bottom portion. The outer rectangular front portion may have a single rectangular section 1a, or a plurality of such rectangular sections 1a, 1b, 1c. The bracket frame is permanently mounted in wall 20. If the window type permits, the frame sections 1a, 1b, 1c may be fabricated as one piece and this frame may be divided and firmly joined to each other by intermediary partitions 21 into several, for instance, three adjacent compartments 17, each of these compartments being so dimensioned and fitted that it can guide and support a packaged unit of a standardized air conditioner, as shown in the drawing. The drawing shows a sample for the arrangement of three of these conditioner units. These packaged standardized units in conformity with the invention are located in the stationary frame or frames as described before. The number of units applicable may, of course, be varied.

The individual movable air conditioner units comprise, as apparent from the drawing, in a housing 2 the standard conditioner system consisting of a sealed compressor 9, evaporator 7, a condenser 5, fan 11, fan 4 to draw-in air, a drip ring and pan 6, a water catch basin 8, a fan motor 10. The housing 2 is provided with an opening 12 and preferably with louvres 13 for room air circulation. Electrical connectors 14 are provided which are fastened to a standard system. Receptacles 15 are located in the partitions 21 of the bracket frame 1a to 1c to plug the electrical connectors 14 into the receptacles 15 after a unit is located in the window frame.

A plate or window pane 16 may be inserted through a slot located in one side of the rectangular front portion of the frame to close the open empty window space when an air conditioning unit is not located therein in working position. A plurality of slots may be provided as shown in Figs. 1 and 2 in the front portion of the frame to receive the plates 16. The individual units are provided with rollers or casters 19 to make the entrance of the units into the frame easier.

The element characterizing the invention over hitherto customary air conditioners consists in the subdivision of the air conditioner installation into a stationary bracket frame 1a, 1b, 1c which is solidly mounted in the wall 20 or in a window or any other place accessible to the outer air; the frame is subdivided into adjacent spaces to take up the standard units which contain the cooling system of convenient type for the air conditioning process. This packaged air conditioning unit is so constructed that the whole package can be slid into the bracket frame which, as stated above, contains the necessary electrical connections to the power supply. These packaged units proper may, therefore, be made of a much smaller capacity and weight than any hitherto customary air conditioner; they can accordingly be easily handled for their placement and location into the permanently fastened bracket frame which may be subdivided to take up any desired number of units.

For instance, in order to have a ¾ H. P. or ¾ ton capacity, the stationary bracket frame may be subdivided to accommodate three adjacent spaces 17 for the reception of three ¼ H. P. standardized packaged air conditioner units.

For an installation of 1 H. P. three spaces for three packaged air conditioning units of ⅓ H. P. or four spaces for four units of ¼ H. P. each may be provided in the bracket frame. The individual standardized units correspond in its external dimensions and shape to the stationary bracket frame and open space dimension for space 17. Being sufficiently light the standardized air conditioner unit can be easily transported and slid into any frame of any window in the apartment or office or building to fit.

The units can be easily plugged into the current power supply; they further can link to the central controls of the system. The main purpose of the arrangement under this invention is to alternate these flexible installation of air conditioner units between the various rooms of a house, such as, for instance, having the advantage of a cooled living room for day operation and early evening use, whilst in the latter part of the evening, already with reduced capacity, a starting cooling by means of some of the air conditioner units may be commenced in the bedroom. At sleeping time more or all of the units will be operated in the bedroom window frame arrangement.

The advantage of these new arrangements of air conditioner units are obvious; the difficulties arising from a limited power supply are eliminated; the comfort and advantage of air conditioning is spread over more than one room of the apartment without basically increasing the investment costs or without overloading the power supply.

A further important advantage of this system of air conditioner units is the great improvement derived from a simplified and standardized equipment which will considerably decrease manufacturing, maintenance and service cost, hitherto weak points of window air conditioner installations. Through the means of standardization and interchangeability, the cost for the individual air conditioner units will be decreased and air conditioning can be brought in the reach of larger buyer groups.

In addition to the above explained advantages, the use of the described air conditioner units has the further great accomplishment that no window, no matter how small or narrow its sections may be, is inadaptable for window air conditioners. This refers especially to casement windows or narrow factory and office windows where frequently cross-sections had to be removed in the past or where even complete windows had to be changed or structural alterations be made which frequently are not permissible under building codes or house regulations.

A new frame construction can be designed in a way that any window frame section can be utilized as an insert and basic part of the bracket frame through easily attached sectional parts mounting as guide numbers for the positioning of the packaged air conditioning sub-units in the concept of this invention.

Also small rooms, for instance, telephone booths, bathrooms, etc., which up to now could not readily enjoy the comfort of air conditioning because they either had no window openings at all or not of a sufficient size, can be easily included in the system of air conditioning by application of standardized units under the scope of the invention.

Since certain changes may be made in the above air conditioner arrangement and system different embodiments of the invention could be made without departing from the scope thereof, it is intended that all matter contained in the above description or shown in the accompanying drawings shall be interpreted as illustrative and not in a limiting sense.

Having thus described the invention, what I claim as new and desire to be secured by Letters Patent, is as follows:

1. An air conditioning installation of a variable operative capacity, comprising an L-shaped bracket frame having an open front portion, means for permanent installation of said frame in a support with said front portion disposed in a recess of said support, and partitions dividing an inner space enclosed by said front portion into a plurality of equal adjacent compartments having openings to receive air conditioning units corresponding in shape to said openings and adapted to be freely movably entered into said compartments and to be removed therefrom, said portion having slots therein, to receive window panes displaceable in the slots to close compartments not occupied by said units.

2. An air conditioning installation of a variable capacity, comprising an L-shaped bracket frame having an open front section, means for permanent installation of said frame in a support with said front portion disposed in a recess of said support, partitions dividing an inner space enclosed by said front portion into a plurality of equal adjacent compartments having openings therein, and a plurality of air conditioning units corresponding in shape to said openings and adapted to be freely movably entered into said compartments and to be removed therefrom, said portion having slots therein, and window panes displaceable in the slots to close compartments not occupied by said units.

3. An air conditioning installation according to claim 2, wherein said units are supported by rollers, and further comprising current contact means applied to said partitions and outer sides of said units.

References Cited in the file of this patent

UNITED STATES PATENTS

| | | |
|---|---|---|
| 672,693 | Bank | Apr. 23, 1901 |
| 2,316,704 | Moore | Apr. 13, 1943 |
| 2,359,051 | Roper | Sept. 26, 1944 |
| 2,519,085 | Eberhart | Aug. 15, 1950 |
| 2,638,755 | Borgerd | May 19, 1953 |
| 2,654,233 | Shoemaker | Oct. 6, 1953 |

FOREIGN PATENTS

| | | |
|---|---|---|
| 507,285 | Great Britain | June 13, 1939 |